United States Patent
Nakagawa et al.

(10) Patent No.: US 6,214,447 B1
(45) Date of Patent: Apr. 10, 2001

(54) LAMINATING PROPYLENE/1-BUTENE RANDOM COPOLYMER COMPOSITION AND COMPOSITE FILM USING THE SAME

(75) Inventors: Norihiko Nakagawa; Masahiro Sugi; Yasuo Tanaka, all of Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 09/056,090

(22) Filed: Apr. 7, 1998

(30) Foreign Application Priority Data

Apr. 7, 1997 (JP) .................................................. 9-088273

(51) Int. Cl.$^7$ .................................................... B32B 27/32
(52) U.S. Cl. .................................. 428/215; 428/355 EN; 428/476.1; 428/475.8; 428/483; 428/515; 428/516; 428/910; 525/240; 526/348; 526/943
(58) Field of Search ............................ 525/240; 428/215, 428/515, 516, 355 EN, 910, 483, 475.8, 476.1; 526/348, 943

(56) References Cited

U.S. PATENT DOCUMENTS

| | | | |
|---|---|---|---|
| 5,336,746 | * 8/1994 | Tsutsui et al. | 526/348.6 |
| 5,639,829 | * 6/1997 | Yamaguchi | 525/240 |
| 5,710,223 | * 1/1998 | Fukuoka et al. | 526/127 |
| 5,854,345 | * 12/1998 | Ueda et al. | 525/322 |

FOREIGN PATENT DOCUMENTS

| | | |
|---|---|---|
| 0716121A1 | * 6/1996 | (EP) . |
| 0844280A1 | * 5/1998 | (EP) . |
| 6-263936 | * 9/1994 | (JP) . |
| 08238730 | * 9/1996 | (JP) . |
| 08238729A | 9/1996 | (JP) . |

OTHER PUBLICATIONS

Database WPI XP–002072569 (Feb. 1994).*

* cited by examiner

Primary Examiner—Paul Thibodeau
Assistant Examiner—D Lawrence Tarazano
(74) Attorney, Agent, or Firm—Birch, Stewart, Kolasch & Birch, LLP

(57) ABSTRACT

A laminating propylene/1-butene random copolymer composition comprising a propylene/1-butene random copolymer and a low-density polyethylene in a specified proportion. With respect to the propylene/1-butene random copolymer, the content of structural units derived from propylene, content of structural units derived from 1-butene, MFR, Mw/Mn and B-value as a parameter indicating the randomness of copolymer monomer chain distribution fall within specified ranges. With respect to the low-density polyethylene, the MFR and density fall within specified ranges. The invention also provides a composite film comprising a substrate film such as a crystalline polypropylene film and, laminated onto at least one side thereof, a resin layer of the above composition having a thickness of 2 to 200 $\mu$m. The above composition is excellent in laminate moldability and enables producing a composite film having excellent low-temperature sealing properties, blocking resistance and hot tack. The composite film is characterized by having excellent low-temperature sealing properties, blocking resistance, slip properties and hot tack.

12 Claims, No Drawings

LAMINATING PROPYLENE/1-BUTENE RANDOM COPOLYMER COMPOSITION AND COMPOSITE FILM USING THE SAME

FIELD OF THE INVENTION

The present invention relates to a laminating propylene/1-butene random copolymer composition which is suitable for use in a laminate layer of a composite film and relates to a composite film formed using the composition.

BACKGROUND OF THE INVENTION

Crystalline polypropylene film has excellent mechanical properties such as tensile strength, rigidity, surface hardness, impact resisting strength and cold resistance, optical properties such as gloss and transparency and food sanitation properties such as nontoxicity and odorlessness. Crystalline polypropylene film is widely employed in the field of, especially, food.

However, crystalline polypropylene film has a high heat sealing temperature with a small range, so that there occur problems of poor welding of heat seal portions and fusion thereof. Thus, for solving the above heat sealing problems of the crystalline polypropylene film, it is common practice to laminate mold a resin layer which is to become a heat seal portion to a surface of the crystalline polypropylene film.

A variety of resins have been studied for use in the formation of the above resin layer. It is required that the resin for use in the formation of the resin layer be capable of:

(1) permitting heat sealing at temperatures appreciably lower than that of the substrate;
(2) having high heat seal strength;
(3) having desirable adherence to the substrate;
(4) having transparency that is identical with or greater than that of the substrate;
(5) being free from blocking during the storage;
(6) being free from sticking to bag forming and filling packing jigs;
(7) having high scratch resistance; and
(8) exhibiting minimal change of the heat seal strength irrespective of the passage of time.

A propylene/1-butene random copolymer is used as the resin capable of forming the resin layer which is to become a heat seal portion. It is known that this copolymer has excellent transparency and low-temperature sealing properties and has relatively good blocking resistance.

In the lamination of the propylene/1-butene random copolymer onto a surface of the crystalline polypropylene film, increasing the laminating speed is likely to cause molding problems such as increases of surging (film fluctuation) and neck-in. For solving these laminating problems, it was proposed to blend low-density polyethylene with the propylene/1-butene random copolymer (see Japanese Patent Laid-open Publication No. 54(1979)-120656).

However, in recent years, the progress in increasing the speed of wrapping machines is remarkable, so that there is a strong demand in the art for the development of a propylene/1-butene random copolymer composition suitable for a laminate molding of a composite film which not only permits sealing at lower temperatures, namely, has excellent low-temperature sealing properties, but also is excellent in blocking resistance and further for the development of the above composite film.

OBJECT OF THE INVENTION

The present invention has been made with a view toward solving the above problems of the prior art, and the object of the present invention is to provide a propylene/1-butene random copolymer composition suitable for a laminate molding of a composite film which is excellent in low-temperature sealing properties and blocking resistance and to provide the composite film thereof.

SUMMARY OF THE INVENTION

The laminating propylene/1-butene random copolymer composition of the present invention comprises 50 to 97% by weight of a propylene/1-butene random copolymer (A) and 50 to 3% by weight of a low-density polyethylene (B), the above propylene/1-butene random copolymer (A):

(1) comprising 50 to 95 mol % of structural units derived from propylene and 5 to 50 mol % of structural units derived from 1-butene;
(2) exhibiting a melt flow rate (measured at 230° C. under a load of 2.16 kg in accordance with ASTM D 1238) of 0.1 to 40 g/10 min;
(3) having a molecular weight distribution (Mw/Mn), measured by gel permeation chromatography (GPC), of up to 3; and
(4) having a B-value, being a parameter indicating a randomness of copolymer monomer chain distribution, of 1.0 to 1.5, and the above low-density polyethylene (B):

(1) exhibiting a melt flow rate (measured at 190° C. under a load of 2.16 kg in accordance with ASTM D 1238) of 1 to 30 g/10 min; and
(2) having a density of not greater than 0.940 g/cm$^3$.

In the present invention, preferably, the propylene/1-butene random copolymer (A):

(4) has a B-value, being a parameter indicating a randomness of copolymer monomer chain distribution, of 1.0 to 1.3;
(5) has a melting point (Tm), measured by a differential scanning calorimeter, of 60 to 140° C., the above melting point, Tm, and a content of 1-butene structural units, M (mol %), satisfying the relationship:

$$-2.6M+130 \leq Tm \leq -2.3M+155;\text{ and}$$

(6) has a crystallinity measured by X-ray diffractometry, C(%), this crystallinity and the content of 1-butene structural units, M (mol %), satisfying the relationship:

$$C \geq -1.5M+75,\text{ and}$$

the above low-density polyethylene (B):

(3) exhibits a melt flow rate (measured at 190° C. under a load of 2.16 kg in accordance with ASTM D 1238) of 1 to 25 g/10 min; and
(4) has a density of 0.915 to 0.935 g/cm$^3$.

The propylene/1-butene random copolymer (A) may be obtained by copolymerizing propylene and 1-butene in the presence of an olefin polymerization catalyst, the above olefin polymerization catalyst comprising:

(a) a transition metal compound represented by the general formula:

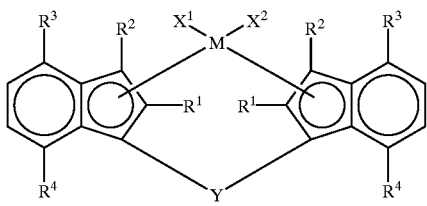

[I]

wherein:

M represents a transition metal of Group IVa, Va or VIa of the periodic table;

each of $R^1$ and $R^2$ independently represents a hydrogen atom, a halogen atom, a hydrocarbon group having 1 to 20 carbon atoms, a halogenated hydrocarbon group having 1 to 20 carbon atoms, a silicon-containing group, an oxygen-containing group, a sulfur-containing group, a nitrogen-containing group or a phosphorus-containing group;

$R^3$ independently represents a secondary or tertiary alkyl group having 3 to 20 carbon atoms or an aromatic group having 6 to 20 carbon atoms;

$R^4$ independently represents a hydrogen atom or an alkyl group having 1 to 20 carbon atoms;

each of $X^1$ and $X^2$ independently represents a hydrogen atom, a halogen atom, a hydrocarbon group having 1 to 20 carbon atoms, a halogenated hydrocarbon group having 1 to 20 carbon atoms, an oxygen-containing group or a sulfur-containing group;

Y represents a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O) (R$^5$)—, —BR$^5$— or —AlR$^5$— (provided that $R^5$ represents a hydrogen atom, a halogen atom, a hydrocarbon group having 1 to 20 carbon atoms or a halogenated hydrocarbon group having 1 to 20 carbon atoms), (b) an organoaluminum oxy compound (b-1) and/or a compound (b-2) capable of reacting with the transition metal compound (a) to thereby form an ion pair, and optionally (c) an organoaluminum compound.

The composite film of the present invention comprises a substrate film and, laminated onto at least one side thereof, a resin layer of the above laminating propylene/1-butene random copolymer composition of the present invention, the above resin layer having a thickness of 2 to 200 μm.

DETAILED DESCRIPTION OF THE INVENTION

The laminating propylene/1-butene random copolymer composition and composite film formed using the same according to the present invention will be described in detail below.

As mentioned above, the laminating propylene/1-butene random copolymer composition of the present invention comprises a propylene/1-butene random copolymer (A) and a low-density polyethylene (B).

Propylene/1-butene Random Copolymer (A)

The propylene/1-butene random copolymer (A) for use in the present invention comprises:

50 to 95 mol %, preferably, 55 to 93 mol % and, still preferably, 60 to 90 mol % of structural units derived from propylene, and 5 to 50 mol %, preferably, 7 to 45 mol % and, still preferably, 10 to 40 mol % of structural units derived from 1-butene.

The propylene/1-butene random copolymer (A) may contain structural units derived from an olefin other than propylene and 1-butene in a small amount of, for example, not greater than 10 mol %, preferably, not greater than 5 mol %.

The propylene/1-butene random copolymer (A) for use in the present invention exhibits a melt flow rate (measured at 230° C. under a load of 2.16 kg in accordance with ASTM D 1238) of 0.1 to 40 g/10 min, preferably, 0.5 to 30 g/10 min and, still preferably, 1 to 20 g/10 min.

The propylene/1-butene random copolymer (A) for use in the present invention has a molecular weight distribution (Mw/Mn), measured by gel permeation chromatography (GPC), of up to 3, preferably, up to 2.5.

The propylene/1-butene random copolymer (A) for use in the present invention has a B-value, being a parameter indicating a randomness of copolymer monomer chain distribution, of 1.0 to 1.5, preferably, 1.0 to 1.3 and, still preferably, 1.0 to 1.2.

This parameter B-value, proposed by B. D. Coleman and T. G. Fox, (J. Polym. Sci., A1, 3183 (1963)), is defined by the formula:

$$B=P_{12}/(2P_1-P_2)$$

wherein $P_1$ and $P_2$ represent first monomer and second monomer content fractions, respectively, and $P_{12}$ represents the proportion of (first monomer)-(second monomer) chains to all bimolecular chains.

When the B-value is 1, the Bernoulli's statistics applies. When the B-value is smaller than 1 (B<1), the copolymer is arranged in the form of block chains. On the other hand, when the B-value is greater than 1 (B>1), the copolymer is arranged in the form of alternate chains.

It is preferred that, in addition to the above properties, the propylene/1-butene random copolymer (A) for use in the present invention have a melting point (Tm), measured by a differential scanning calorimeter, of 60 to 140° C., especially, 80 to 130° C. It is also preferred that the above melting point, Tm, and a content of 1-butene structural units, M (mol %), satisfy the relationship:

$$-2.6M+130<Tm<-2.3M+155.$$

When the melting point of the propylene/1-butene random copolymer exceeds 140° C., the suitable film heat sealing temperature becomes as high as 130° C. or above. On the other hand, when the melting temperature is lower than 60° C., the scratch resistance is deteriorates although the low-temperature heat sealing properties are improved and, further, film blocking may occur during the storage, thereby rendering practical use difficult.

Moreover, the propylene/1-butene random copolymer (A) preferably has a crystallinity measured by X-ray diffractometry, C(%), this crystallinity and the content of 1-butene structural units, M (mol %), satisfying the relationship:

$$C \geq -1.5M+75.$$

The crystallinity of the propylene/1-butene random copolymer (A) preferably ranges from 15 to 65%, still preferably, from 20 to 60%.

The use of the propylene/1-butene random copolymer (A) whose crystallinity falls within the above range enables obtaining a composition capable of providing a film which is excellent in not only scratch resistance and low-temperature heat sealing properties, but also blocking resistance.

The propylene/1-butene random copolymer (A) for use in the present invention may contain position irregular units attributed to 2,1-insertion of propylene monomer in a ratio to all propylene structural units of 0.05% or more, which ratio can be determined by $^{13}$C-NMR spectrum.

In the polymerization, the propylene monomer rarely undergoes 2,1-insertion although it generally undergoes 1,2-insertion (methylene side is bonded with the catalyst). The 2,1-inserted monomer forms position irregular units in the polymer.

The ratio of 2,1-inserted propylene monomer to all propylene structural units can be determined by the use of $^{13}$C-NMR with reference to Polymer, 30(1989), 1350. The ratio is calculated by the formula:

{Ratio of position irregular units attributed to 2,1-insertion}=

$$\frac{\{0.5I\alpha\beta(\text{structures (iii), (v)}) + 0.25I\alpha\beta(\text{structure (iv)})\}}{\{I\alpha\alpha + I\alpha\beta(\text{structures (iii), (v)}) + 0.5(I\alpha\gamma + I\alpha\beta(\text{structure (iv)}) + I\alpha\delta\}} \times 100.$$

The peaks were designated according to the method of Carman et al. (Rubber Chem. Technol., 44(1971), 781). Iαβ and the like represent the area of peak αβ and the like.

When it is difficult to directly determine the area of Iαβ and the like from the spectrum because of, for example, the overlapping of peaks, a carbon peak having the corresponding area can be used in place of the same.

The propylene/1-butene random copolymer (A) for use in the present invention may contain position irregular units attributed to 1,3-insertion of propylene monomer in an amount of up to 0.05%.

The amount of 3 consecutive chains attributed to 1,3-insertion of propylene can be determined by βγ peak (resonance at about 27.4 ppm).

The above propylene/1-butene random copolymer (A) can be obtained by copolymerizing propylene and 1-butene in the presence of an olefin polymerization catalyst (metallocene catalyst) comprising:

(a) a specified transition metal compound (metallocene compound), (b) an organoaluminum oxy compound (b-1) and/or a compound (b-2) capable of reacting with the transition metal compound (a) to thereby form an ion pair, and optionally (c) an organoaluminum compound.

Transition Metal Compound (Metallocene Compound) (a)

The above transition metal compound (a) is represented by the general formula:

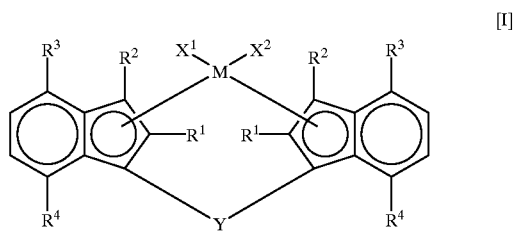

In the formula, M represents a transition metal of Group IVa, Va or VIa of the periodic table. Preferred examples thereof include titanium, zirconium and hafnium. Of these, zirconium is especially preferred.

Substituents $R^1$ and $R^2$

Each of $R^1$ and $R^2$ independently represents a hydrogen atom, a halogen atom, a hydrocarbon group having 1 to 20 carbon atoms, a halogenated hydrocarbon group having 1 to 20 carbon atoms, a silicon-containing group, an oxygen-containing group, a sulfur-containing group, a nitrogen-containing group or a phosphorus-containing group.

Substituent $R^3$

Each of $R^3$ independently represents a hydrocarbon group having 1 to 20 carbon atoms, which may be substituted with a halogen atom or a silicon-containing group. In particular, it is preferred that $R^3$ represent a secondary or tertiary alkyl group having 3 to 20 carbon atoms or an aromatic group having 6 to 20 carbon atoms.

Substituent $R^4$

Each of $R^4$ independently represents a hydrogen atom or an alkyl group having 1 to 20 carbon atoms. This alkyl group may be substituted with a halogen atom or a silicon-containing group.

$X^1$ and $X^2$

Each of $X^1$ and $X^2$ independently represents a hydrogen atom, a halogen atom, a hydrocarbon group having 1 to 20 carbon atoms, a halogenated hydrocarbon group having 1 to 20 carbon atoms, an oxygen-containing group or a sulfur-containing group.

Y

Y represents a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, etc.

It is especially preferred that Y represent an alkylsilylene, an alkylarylsilylene or an arylsilylene.

Among the transition metal compounds (a) of the general formula [I], those wherein $R^1$ is a methyl group are especially preferred.

A multiplicity of specific examples of the transition metal compounds (a) represented by the general formula (I) are set forth in Japanese Patent Laid-open Publication No. 8(1996)-238729.

The above transition metal compounds for use in the present invention can be produced in accordance with pages 63–67 of Journal of Organometallic Chem. 288(1985) and the description and examples of European Patent Laid-open Publication No. 0,320,762.

Orgranoaluminum Oxy Compound (b-1)

Aluminooxanes are preferably used as the above organoaluminum oxy compound (b-1). For example, use is made of methylaluminooxane, ethylaluminooxane, methylethylaluminooxane and the like which individually have generally about 3 to 50 repeating units represented by the formula: —Al(R)O— wherein R represents an alkyl group. These aluminooxanes can be produced by the conventional process.

Also, the organoaluminum oxy compound (b-1) may be benzene-insoluble organoaluminum oxy compounds listed by way of example in Japanese Patent Laid-open Publication No. 2(1990)-78687.

Compound (b-2) Capable of Reacting with Transition Metal Compound (a) to Thereby Form Ion Pair Examples of the compounds (ionizing ionic compounds) (b-2) capable of reacting with the transition metal compound (a) to thereby form an ion pair, employed in the present invention, include Lewis acids listed in U.S. Pat. No. 5,321,106 such as triphenylboron, $MgCl_2$, $Al_2O_3$ and $SiO_2$—$Al_2O_3$.

These ionizing ionic compounds (b-2) can be used either individually or in combination.

Organoaluminum compound (c)

Examples of the organoaluminum compounds (c) employed according to necessity in the present invention include trialkylaluminums, dialkylaluminum halides, alkylaluminum sesquihalides and alkylaluminum dihalides.

These organoaluminum compounds can be used either individually or in combination.

The olefin polymerization catalyst for use in the present invention is formed from the above transition metal compound (a), organoaluminum oxy compound (b-1) and/or ionizing ionic compound (b-2), and optionally the organoaluminum compound (c). The olefin polymerization catalyst can be prepared by mixing in an inert hydrocarbon solvent or an olefin solvent the above transition metal compound (a), organoaluminum oxy compound (b-1) and/or ionizing ionic compound (b-2), and optionally the component (c).

Further, in the present invention, an olefin prepolymerization can be conducted in the above olefin polymerization catalyst forming components before the use thereof.

Examples of suitable olefins used in the prepolymerization include propylene, ethylene and 1-butene. However, also, use can be made of mixtures thereof with other olefins.

The propylene/1-butene random copolymer (A) for use in the present invention can be produced by copolymerizing propylene and 1-butene in the presence of the above olefin polymerization catalyst.

This polymerization can be performed by any of the liquid phase polymerization techniques such as suspension polymerization, solution polymerization and vapor phase polymerization.

The molecular weight of the obtained propylene/1-butene random copolymer (A) can be regulated by causing hydrogen to be present in the polymerization system or by changing the polymerization temperature and polymerization pressure.

The process for producing the propylene/1-butene random copolymer (A) is described in detail in Japanese Patent Laid-open Publication No. 8(1996)-238729.

The propylene/1-butene random copolymer (A) is used in an amount of 50 to 97% by weight, preferably, 55 to 96% by weight and, still preferably, 60 to 95% by weight based on 100 % by weight of the sum of the propylene/1-butene random copolymer (A) and the low-density polyethylene (B).

Low-density Polyethylene (B)

The low-density polyethylene (B) for use in the present invention is preferably an ethylene homopolymer or a copolymer of ethylene and an α-olefin having 3 to 20 carbon atoms, and the density thereof is preferably not greater than 0.940 g/cm$^3$, still preferably, in the range of 0.915 to 0.935 g/cm$^3$ and, yet still preferably, in the range of 0.916 to 0.925 g/cm$^3$.

The above α-olefin is, for example, selected from among propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethyl-1-butene, propyl-1-pentene, 1-decene, methyl-1-nonene, dimethyl-1-octene, trimethyl-1-heptene, ethyl-1-octene, methylethyl-1-heptene, diethyl-1-hexene, 1-dodecene and 1-hexadodecene.

These α-olefins can be used either individually or in combination.

The low-density polyethylene (B) for use in the present invention exhibits a melt flow rate (MFR; measured at 190° C. under a load of 2.16 kg in accordance with ASTM D 1238) of 1 to 30 g/10 min, preferably, 1 to 25 g/10 min and, still preferably, 3 to 20 g/10 min.

The above low-density polyethylene (B) can be produced by conventional processes, for example, the high pressure process. The production of the low-density polyethylene (B) with the above properties can be conducted in the presence of metallocene catalyst.

The low-density polyethylene (B) is used in an amount of 50 to 3% by weight, preferably, 45 to 4% by weight and, still preferably, 40 to 5% by weight based on 100% by weight of the sum of the propylene/1-butene random copolymer (A) and the low-density polyethylene (B). When laminated onto a surface of a crystalline polypropylene film, the propylene/1-butene random copolymer (A) composition containing the low-density polyethylene (B) in the above amount exhibits excellent moldability without suffering from surging or neck-in enlargement even if the laminating speed is increased.

Other Components

The laminating propylene/1-butene random copolymer composition of the present invention can contain, in addition to the above propylene/1-butene random copolymer (A) and low-density polyethylene (B), various additives such as an antioxidant, an ultraviolet absorber, a lubricant, a nucleating agent, an antistatic agent, a flame retarder, a pigment, a dye and an organic or inorganic filler in an amount not detrimental to the object of the present invention.

Preparation of Laminating Propylene/1-butene Random Copolymer Composition

The laminating propylene/1-butene random copolymer composition of the present invention can be prepared by any of common blending techniques. For example, the composition can be prepared by mixing the above components by means of a mixing machine such as a V-blender, a ribbon blender or a Henschel mixer, or by kneading the above components by a kneading machine such as an extruder, a mixing roll mill, a Banbury mixer or a kneader. Further, the laminating propylene/1-butene random copolymer composition of the present invention can also be prepared by mixing or kneading the above components by the use of the above mixing and kneading means in combination.

Composite Film

The composite film of the present invention comprises a substrate film and, laminated onto at least one side thereof, a resin layer of the above laminating propylene/1-butene random copolymer composition of the present invention, the above resin layer having a thickness of 2 to 200 μm, preferably, 10 to 60 μm.

Examples of polymers suitably used in the substrate film include:

polyolefins such as polypropylene and poly-1-butene;
polyamides such as nylon 6 and nylon 66; and
polyesters such as polyethylene terephthalate and polybutylene terephthalate. These may be in the form of a nonoriented film or may be in the form of a uniaxially or biaxially oriented film. A biaxially oriented polypropylene film is especially preferred.

It is preferred that the polypropylene used in the molding of this polypropylene film be propylene homopolymer or a random or block copolymer of propylene and another α-olefin such as ethylene or 1-butene (generally, the content of propylene structural units is at least 90 mol %) whose boiling n-heptane insoluble content is at least 90%, especially, at least 93%.

The above polypropylene can be produced with the use of, as a typical example, a catalyst composed of a solid titanium catalyst component and an organometallic compound catalyst component or a catalyst composed of these components and an electron donor.

As the above solid titanium catalyst component, there can be mentioned, for example, a titanium trichloride or titanium trichloride composition produced by various methods, or a supported titanium catalyst component comprising magnesium, a halogen, an electron donor (preferably, an aromatic carboxylic acid ester or alkylated ether) and titanium as essential ingredients. A supported titanium catalyst component having a specific surface area of at least 100 $m^2/g$ is especially preferred.

The above organometallic compound catalyst component is preferably an organoaluminum compound such as a trialkylaluminum, a dialkylaluminum halide, an alkylaluminum sesquihalide or an alkylaluminum dihalide. The suitability of such a compound as the catalyst component depends on the type of the titanium catalyst component. Thus, it is preferred that the organoaluminum compound for use be selected in conformity with the type of employed titanium catalyst component.

The above electron donor is, for example, selected from among organic compounds containing nitrogen, phosphorus, sulfur, oxygen, silicon, boron, etc. Preferred examples thereof are esters and ethers.

The crystalline polypropylene can be produced by the conventional process using the above conventional solid titanium catalyst component or metallocene compound catalyst component.

With respect to the polypropylene resin (A), either may a single variety be used individually or a plurality of different varieties may be used in combination.

The composite film of the present invention can be produced, for example, by performing an extrusion coating of the above laminating propylene/1-butene random copolymer composition of the present invention through a T-die onto a substrate.

Effect of the Invention

The laminating propylene/1-butene random copolymer composition of the present invention is excellent in laminate moldability and enables producing a composite film having excellent low-temperature sealing properties, blocking resistance and hot tack.

By virtue of the structure comprising a substrate film and, laminated onto at least one side thereof, the laminating propylene/1-butene random copolymer composition of the present invention, the composite film of the present invention has excellent low-temperature sealing properties, blocking resistance, slip properties and hot tack.

EXAMPLE

The present invention will now be illustrated in greater detail with reference to the following Examples, which in no way limit the scope of the invention.

Properties and characteristics of the propylene/1-butene random copolymer were measured by the following methods.

(1) Propylene content and 1-butene content:
  determined by the use of $^{13}$C-NMR.
(2) MFR:
  measured at 230° C. under a load of 2.16 kg in accordance with ASTM D 1238.
(3) Molecular weight distribution (Mw/Mn):
  measured by the use of GPC-150C manufactured by Millipore.
  Specifically, use was made of separating column TSK GNH HT having a size of 27 mm in diameter and 600 mm in length. The column was heated at 140° C., and o-dichlorobenzene (produced by Wako Pure Chemical Industries Ltd.) and 0.025% by weight BHT (produced by Takeda Chemical Industries, Ltd.) were used as a mobile phase and an antioxidant, respectively. The moving velocity was set at 1.0 ml/min, and the sample concentration and injected sample quantity were 0.1% by weight and 500 μl, respectively. A differential refractometer was used as the detector.
  Standard polystyrene produced by Tosoh Corporation was used for molecular weights Mw<1000 and Mw>4×10$^6$, and standard polystyrene produced by Pressure Chemical was used for molecular weights Mw satisfying the relationship 1000<Mw<4×10$^6$.
(4) B-Value:
  About 200 mg of copolymer was homogeneously dissolved in 1 ml of hexachlorobutadiene in a sample tube having a diameter of 10 mm. $^{13}$C-NMR spectrum of a sample thereof was taken under measuring conditions such that the measuring temperature, measuring frequency, spectrum width, filter width, pulse cycle time and integration times were 120° C., 25.05 MHz, 1500 Hz, 1500 Hz, 4.2 sec and 2000 to 5000 times, respectively. $P_E$, $P_O$ and $P_{OE}$ were determined from the spectrum, and the B-value was calculated by the use of the formula given hereinbefore.
(5) Melting point (Tm):
  measured by the use of differential scanning calorimeter (DSC), model DSC-7 manufactured by Perkin Elmer.
  Specifically, about 5 mg of a sample was packed in an aluminum pan, heated to 200° C., held at 200° C. for 5 min, cooled to −40° C. at a rate of 10° C/min and held at −40° C.

for 5 min. Thereafter, the temperature was raised at a rate of 10° C./min, thereby obtaining an endothermic curve from which the melting point was determined.

(6) Crystallinity:

A 1.0 mm thick pressed sheet having been allowed to stand still for at least 24 hr after molding was analyzed by X-ray diffractometry from which the crystallinity was determined.

The composite films obtained in the Examples and Comparative Examples were tested with respect to the haze, change of haze with the passage of time, gloss, slip properties, change of slip properties with the passage of time, blocking resistance, change of blocking resistance with the passage of time, interlayer bonding strength, heat sealing properties and hot tack. The following testing methods were employed.

(1) Haze:

measured in accordance with ASTM D 1003.

(2) Change of haze with the passage of time:

The composite film was held at 80° C. for 3 days and allowed to cool, and its haze was measured in the same manner as in item (1) above.

(3) Gloss:

measured in accordance with ASTM D 523.

(4) Slip properties (coefficient of static friction and coefficient of dynamic friction):

The composite film was annealed at 40° C. for one day, and the coefficient of static friction and coefficient of dynamic friction of the surface of the layer of propylene/1-butene random copolymer composition were measured in accordance with ASTM D 1894.

(5) Change of slip properties with the passage of time:

The composite film was held at 40° C. for one week and allowed to cool, and the coefficient of static friction and coefficient of dynamic friction thereof were measured in the same manner as in item (4) above.

(6) Blocking resistance (blocking strength):

Two composite films were piled one upon the other so that their propylene/1-butene random copolymer composition layers contacted each other and annealed at 50° C. for one day, and the blocking strength was measured in accordance with ASTM D 1893.

(7) Change of blocking resistance with the passage of time:

The composite films were held at 50° C. for one week and allowed to cool, and the blocking strength was measured in the same manner as in item (6) above.

(8) Interlayer bonding strength:

A 15 mm wide test piece was cut from the composite film. The layers were peeled from each other at one edge of the test piece, and the interlayer bonding strength (peeling strength) between the substrate film layer and the propylene/1-butene random copolymer composition layer was measured by the use of Instron tensile tester in accordance with the T-peel method in which the peeling was conducted at a speed of 300 mm/min.

(9) Heat sealing properties (heat sealing bonding strength):

Two composite films were piled one upon the other so that their propylene/1-butene random copolymer composition layers contacted each other, heat sealed at each of 80° C., 90° C., 100° C., 110° C., 120° C. and 130° C. under a pressure of 2 kg/cm$^2$ for one second, this heat sealing conducted at a seal bar width of 5 mm, and allowed to cool.

A 15 mm wide test piece was cut from each of the composite films heat sealed at the above varied temperatures, and the peeling strength of each test piece was measured by peeling the heat sealed portion at a cross head speed of 200 mm/min.

(10) Hot tack:

Two composite films were piled one upon the other so that their propylene/1-butene random copolymer composition layers contacted each other and heat sealed at each of 80° C., 90° C., 100° C., 110C, 120° C. and 130° C. under a pressure of 2 kg/cm$^2$ for one second. After the heat sealing, a load of 45 g was applied and a peeled distance of the sealed portion was measured.

Production Example 1

Production of Propylene/1-butene random Copolymer (PBR-1)

900 ml of hexane and 60 g of 1-butene were charged into a 2-lit. autoclave satisfactorily purged with nitrogen. 1 mmol of triisobutylaluminum was added thereto and heated to 70° C. Subsequently, propylene was fed to a total pressure of 7 kg/cm$^2$-G, and 0.30 mmol of methylaluminooxane and 0.001 mmol, in terms of Zr atom, of rac-dimethylsilylene-bis[1-(2-methyl-4-phenylindenyl)]zirconium dichloride were added. Polymerization was carried out for 30 min while continuously supplying propylene and while maintaining the total pressure at 7 kg/cm$^2$-G. After the polymerization, deaeration was conducted and a polymer was recovered in a large volume of methanol. The polymer was dried in vacuum at 110° C. for 12 hr.

The yield of the thus obtained polymer (propylene/1-butene random copolymer (PBR-1)) was 39.7 g, so that the polymerization activity was 79 kg-polymer/mmolZr-hr.

This polymer was analyzed and it was found that the content of structural units derived from 1-butene was 24 mol %, the melt flow rate (measured at 230° C. under a load of 2.16 kg in accordance with ASTM D 1238) was 20 g/10 min, the molecular weight distribution (Mw/Mn) determined by GPC was 2.1, the B-value was 1.00, the melting point (Tm) was 91° C. and the crystallinity determined by X-ray diffractometry was 40%.

Production Example 2

Production of Propylene/1-butene random Copolymer (PBR-2)

830 ml of hexane and 100 g of 1-butene were charged into a 2-lit. autoclave satisfactorily purged with nitrogen. 1 mmol of triisobutylaluminum was added thereto and heated to 70° C. Subsequently, propylene was fed to a total pressure of 7 kg/cm$^2$-G, and 1 mmol of triethylaluminum and 0.005 mmol, in terms of Ti atom, of titanium catalyst supported on magnesium chloride were added. Polymerization was carried out for 30 min while continuously supplying propylene and while maintaining the total pressure at 7 kg/cm$^2$-G. After the polymerization, deaeration was conducted and a polymer was recovered in a large volume of methanol. The polymer was dried in vacuum at 110° C. for 12 hr.

The yield of the thus obtained polymer (propylene/1-butene random copolymer (PBR-2)) was 33.7 g, so that the polymerization activity was 14 kg-polymer/mmolZr-hr.

This polymer was analyzed and it was found that the content of structural units derived from 1-butene was 24 mol %, the melt flow rate (measured at 230° C. under a load of 2.16 kg in accordance with ASTM D 1238) was 20 g/10 min, the molecular weight distribution (Mw/Mn) determined by GPC was 4.2, the B-value was 0.92, the melting point (Tm) was 110° C. and the crystallinity determined by X-ray diffractometry was 48%.

Example 1

Preparation of Propylene/1-butene Random Copolymer Composition 90 parts by weight of propylene/1-butene random copolymer (PBR-1) obtained in Production Example 1 and 10 parts by weight of low-density polyethylene (density: 0.917 g/cm$^3$, MFR: 7 g/10 min, crystallinity: 4%, content of structural units derived from ethylene: 80 mol % and content of structural units derived from propylene: 20 mol %) were mixed together in molten state at 280° C., thereby obtaining a propylene/1-butene random copolymer composition.

An extrusion coating (laminate molding) of this composition was performed on a biaxially oriented polypropylene film layer having a thickness of 20 µm under the following conditions, thereby forming a composite film.

Molding conditions

Film layer construction and thickness of each layer: thickness of biaxially oriented polypropylene film layer (substrate film layer)/thickness of composition layer=20 µm/20 µm, Molding machine: extruder with a die diameter of 65 mm (for composition layer), temperature set at 280° C., and Molding speed: 80 m/min.

The thus obtained composite film was subjected to the above tests, and the test results are given in Table 1.

In the above laminate molding, the molding speed was gradually increased and not only was the maximum laminating speed (m/min) as an index for the laminate moldability determined but also the neck-in (mm) thereat was measured. The terminology "maximum laminating speed" used herein means the molding speed at which surging occurs when only the take-off speed is increased while extruding the composition into a layer having a thickness of 20 µm on a biaxially oriented polypropylene film at a speed of 80 m/min.

The results are given in Table 1.

Example 2

Propylene/1-butene random copolymer composition was prepared in the same manner as in Example 1, except that the amounts of the propylene/1-butene random copolymer (PBR-1) and low-density polyethylene were changed to 80 parts by weight and 20 parts by weight, respectively.

A composite film was prepared by the same laminate molding as in Example 1 and was subjected to the above tests. The test results are given in Table 1.

In the above laminate molding, the molding speed was gradually increased and not only was the maximum laminating speed (m/min) as an index for the laminate moldability determined but also the neck-in (mm) thereat was measured.

The results are given in Table 1.

Comparative Example 1

A laminate molding of composite film was performed in the same manner as in Example 1, except that the propylene/1-butene random copolymer (PBR-1) was used alone in place of the propylene/1-butene random copolymer composition of Example 1. The obtained composite film was subjected to the above tests and the test results are given in Table 1.

In the above laminate molding, the molding speed was gradually increased and not only was the maximum laminating speed (m/min) as an index for the laminate moldability determined but also the neck-in (mm) thereat was measured.

The results are given in Table 1.

Comparative Example 2

Propylene/1-butene random copolymer composition was prepared in the same manner as in Example 1, except that 90 parts by weight of the propylene/1-butene random copolymer (PBR-2) obtained in Production Example 2 was used in place of 90 parts by weight of the propylene/1-butene random copolymer (PBR-1).

A composite film was prepared by the same laminate molding as in Example 1 and was subjected to the above tests. The test results are given in Table 1.

In the above laminate molding, the molding speed was gradually increased and not only was the maximum laminating speed (m/min) as an index for the laminate moldability determined but also the neck-in (mm) thereat was measured.

The results are given in Table 1.

Comparative Example 3

Propylene/1-butene random copolymer composition was prepared in the same manner as in Example 1, except that 80 parts by weight of the propylene/1-butene random copolymer (PBR-2) obtained in Production Example 2 was used in place of 90 parts by weight of the propylene/1-butene random copolymer (PBR-1) and that the amount of the low-density polyethylene was changed to 20 parts by weight.

A composite film was prepared by the same laminate molding as in Example 1 and was subjected to the above tests. The test results are given in Table 1.

In the above laminate molding, the molding speed was gradually increased and not only was the maximum laminating speed (m/min) as an index for the laminate moldability determined but also the neck-in (mm) thereat was measured.

The results are given in Table 1

TABLE 1

|  | Example | | Comparative Exam. | | |
| --- | --- | --- | --- | --- | --- |
|  | 1 | 2 | 1 | 2 | 3 |
| Composition of laminate PBR-(1) or (2) | (1) | (1) | (1) | (2) | (2) |
| propylene cont. (mol %) | 76 | 76 | 76 | 76 | 76 |
| 1-butene cont. (M) (mol %) | 24 | 24 | 24 | 24 | 24 |
| MFR (g/10 min) | 20 | 20 | 20 | 20 | 20 |
| Mw/Mn | 2.1 | 2.1 | 2.1 | 4.2 | 4.2 |
| B-value | 1.00 | 1.00 | 1.00 | 0.92 | 0.92 |
| Tm (° C.) | 91 | 91 | 91 | 110 | 110 |
| crystallinity (C) (%) | 40 | 40 | 40 | 48 | 48 |
| Low-density polyethylene (II) MFR (g/10 min) | 7 | 7 | 7 | 7 | 7 |
| density (g/cm$^3$) | 0.917 | 0.917 | 0.917 | 0.917 | 0.917 |
| Wt. ratio of (I)/(II) | 90/10 | 80/20 | 100/0 | 90/10 | 80/20 |
| Laminate moldability max. lamination speed (m/min) | 140 | 150 | 50 | 140 | 150 |
| neck-in (mm) | 50 | 50 | 150 | 60 | 50 |
| Film properties Haze (%) | 1.3 | 1.9 | 1.7 | 2.2 | 3.0 |
| Change with time of haze (%) | 1.5 | 2.2 | 1.9 | 2.8 | 4.1 |
| Gloss (%) | 134 | 128 | 130 | 104 | 90 |
| Slip properties |  |  |  |  |  |
| coeff. of static friction | 0.3 | 0.2 | 0.3 | 0.6 | 0.4 |
| coeff. of dynamic friction | 0.2 | 0.2 | 0.3 | 0.5 | 0.4 |

TABLE 1-continued

| | Example | | Comparative Exam. | | |
|---|---|---|---|---|---|
| | 1 | 2 | 1 | 2 | 3 |
| Slip properties (change with time) | | | | | |
| coeff. of static friction | 0.2 | 0.2 | 0.3 | 0.7 | 0.5 |
| coeff. of dynamic friction | 0.2 | 0.2 | 0.3 | 0.5 | 0.4 |
| Blocking resistance (mN/cm) | 5 | 4 | 7 | 25 | 20 |
| Blocking resistance (change w. time) (mN/cm) | 7 | 8 | 12 | 44 | 38 |
| Interlayer bonding strength (N/15 mm) | 3.0 | 3.1 | 2.6 | 2.8 | 3.0 |
| Heat Sealing bonding strength (N/15 mm) sealing temp. | | | | | |
| 80° C. | 1.7 | 1.5 | 2.0 | — | — |
| 90° C. | 4.2 | 4.5 | 4.9 | 1.4 | 1.8 |
| 100° C. | 9.2 | 8.9 | 9.7 | 5.2 | 5.8 |
| 110° C. | 13.5 | 13.3 | 14.0 | 10.6 | 9.2 |
| 120° C. | 14.4 | 14.1 | 14.2 | 13.3 | 13.4 |
| 130° C. | 13.9 | 13.8 | 14.6 | 14.5 | 13.9 |
| Hot tack [mm] | | | | | |
| 80° C. | 300 | 300 | 300 | — | — |
| 90° C. | 70 | 100 | 130 | 300 | 300 |
| 100° C. | 15 | 12 | 20 | 150 | 120 |
| 110° C. | 5 | 5 | 9 | 18 | 11 |
| 120° C. | 2 | 4 | 9 | 4 | 5 |
| 130° C. | 2 | 2 | 3 | 3 | 5 |

Note:
PBR-(1) = propylene/1-butene random copolymer (1).
PBR-(2) = propylene/1-butene random copolymer (2).

What is claimed is:

1. A composite film comprising a substrate film and, laminated onto at least one side thereof, a 2 to 200 μm thick resin layer of a laminating propylene/1-butene random copolymer composition comprising 50 to 97% by weight of a propylene/1-butene random copolymer (A) and 50 to 3% by weight of a low-density polyethylene (B), said propylene/1-butene random copolymer (A):

(1) comprising 50 to 95 mol % of structural units derived from propylene and 5 to 50 mol % of structural units derived from 1-butene;

(2) exhibiting a melt flow rate (measured at 230° C. under a load of 2.16 kg in accordance with ASTM D 1238) of 0.1 to 40 g/10 min;

(3) having a molecular weight distribution (Mw/Mn), measured by gel permeation chromatography (GPC), of up to 3; and (4) having a B-value, being a parameter indicating a randomness of copolymer monomer chain distribution, of 1.0 to 1.5, and said low-density polyethylene (B):

(1) exhibiting a melt flow rate (measured at 190° C. under a load of 2.16 kg in accordance with ASTM D 1238) of 1 to 30 g/10 min; and (2) having a density of not greater than 0.940 g/cm$^3$.

2. The composite film as claimed in claim 1, wherein the propylene/1-butene random copolymer (A):

(4) has a B-value, being a parameter indicating a randomness of copolymer monomer chain distribution, of 1.0 to 1.3;

(5) has a melting point (Tm), measured by a differential scanning calorimeter, of 60 to 140° C., said melting point, Tm, and a content of 1-butene structural units, M (mol %), satisfying the relationship:

$$-2.6M+130 \leq Tm \leq -2.3M+155;\ \text{and}$$

(6) has a crystallinity measured by X-ray diffractometry, C(%), said crystallinity and the content of 1-butene structural units, M (mol %), satisfying the relationship:

$$C \geq -1.5M+75,\ \text{and}$$

said low-density polyethylene (B):

(3) exhibits a melt flow rate (measured at 190° C. under a load of 2.16 kg in accordance with ASTM D 1238) of 1 to 25 g/10 min; and (4) has a density of 0.915 to 0.935 g/cm$^3$.

3. The composite film as claimed in claim 1, wherein the propylene/1-butene random copolymer (A) is obtained by copolymerizing propylene and 1-butene in the presence of an olefin polymerization catalyst, said olefin polymerization catalyst comprising:

(a) a transition metal compound represented by the general formula:

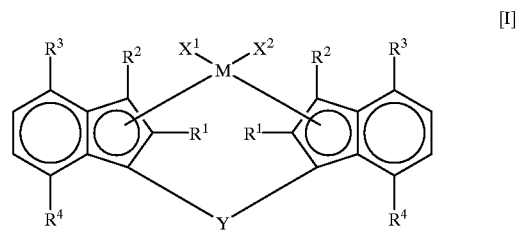

[I]

wherein:

M represents a transition metal of Group IVa, Va or VIa of the periodic table;

each of $R^1$ and $R^2$ independently represents a hydrogen atom, a halogen atom, a hydrocarbon group having 1 to 20 carbon atoms, a halogenated hydrocarbon group having 1 to 20 carbon atoms, a silicon-containing group, an oxygen-containing group, a sulfur-containing group, a nitrogen-containing group or a phosphorus-containing group;

each of $R^3$ independently represents a secondary or tertiary alkyl having 3 to 20 carbon atoms or an aromatic group having 6 to 20 carbon atoms;

each of $R^4$ independently represents a hydrogen atom or an alkyl group having 1 to 20 carbon atoms;

each of $X^1$ and $X^2$ independently represents a hydrogen atom, a halogen atom, a hydrocarbon group having 1 to 20 carbon atoms, a halogenated hydrocarbon group having 1 to 20 carbon atoms, an oxygen-containing group or a sulfur-containing group;

Y represents a divalent hydrocarbon group having 1 to 20 carbon atoms, a divalent halogenated hydrocarbon group having 1 to 20 carbon atoms, a divalent silicon-containing group, a divalent germanium-containing group, a divalent tin-containing group, —O—, —CO—, —S—, —SO—, —SO$_2$—, —NR$^5$—, —P(R$^5$)—, —P(O)(R$^5$)—, —BR$^5$— or —AlR$^5$— (provided that R$^5$ represents a hydrogen atom, a halogen atom, a hydrocarbon group having 1 to 20 carbon atoms or a halogenated hydrocarbon group having 1 to 20 carbon atoms), and (b) an organoaluminum oxy compound (b-1) and/or a compound (b-2) capable of reacting with the transition metal compound (a) to thereby form an ion pair.

4. The composite film as claimed in claim 1, wherein the low-density polyethylene (B) comprises an ethylene homopolymer or a copolymer of ethylene and an α-olefin having 3 to 20 carbon atoms.

5. The composite film as claimed in claim 4, wherein the α-olefin is at least one selected from the group consisting of propylene, 1-butene, 1-pentene, 2-methyl-1-butene, 3-methyl-1-butene, 1-hexene, 3-methyl-1-pentene, 4-methyl-1-pentene, 3,3-dimethyl-1-butene, 1-heptene, methyl-1-hexene, dimethyl-1-pentene, trimethyl-1-butene, ethyl-1-pentene, 1-octene, methyl-1-pentene, dimethyl-1-hexene, trimethyl-1-pentene, ethyl-1-hexene, methylethyl-1-pentene, diethy-1-butene, propyl-1-pentene, 1-decene, methyl-1-nonene, dimethyl-1-octene, trimethyl-1-heptene, ethyl-1-octene, methylethyl-1-heptene, diethyl-1-hexene, 1-dodecene and 1-hexadodecene.

6. The composite film as claimed in claim 1, which further comprises an antioxidant, an ultraviolet absorber, a lubricant, a nucleating agent, an antistatic agent, a flame retarder, a pigment, a dye or a filler.

7. The composite film as claimed in claim 6, wherein the filler is an organic filler or an inorganic filler.

8. The composite film as claimed in claim 1, wherein the substrate film comprises a polymer selected from the group consisting of polypropylene, poly-1-butene, nylon 6, nylon 66, polyethylene terephthalate and polybutylene terephthalate.

9. The composite film as claimed in claim 1, wherein the substrate film is uniaxially or biaxially oriented.

10. The composite film as claimed in claim 8, wherein the substrate film is polypropylene comprising a random or block copolymer of propylene and an α-olefin selected from the group consisting of ethylene and 1-butene.

11. The composite film as claimed in claim 10, wherein the propylene copolymer has at least 90 mol % propylene structural units.

12. The composite film as claimed in claim 10, wherein the propylene copolymer has a boiling n-heptane insoluble content of at least 90%.

* * * * *